(12) United States Patent
Kazemi et al.

(10) Patent No.: US 10,080,103 B2
(45) Date of Patent: Sep. 18, 2018

(54) RANGE-FREE PROXIMITY DETERMINATION

(71) Applicant: Apple Inc., Cupertino, CA (US)

(72) Inventors: Pejman Lotfali Kazemi, Sunnyvale, CA (US); Lukas M. Marti, Santa Clara, CA (US); Robert Mayor, Half Moon Bay, CA (US); Shannon M. Ma, San Francisco, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/891,453

(22) Filed: Feb. 8, 2018

(65) Prior Publication Data

US 2018/0167771 A1 Jun. 14, 2018

Related U.S. Application Data

(62) Division of application No. 14/157,425, filed on Jan. 16, 2014.

(51) Int. Cl.
| | |
|---|---|
| *H04W 24/00* | (2009.01) |
| *H04W 4/021* | (2018.01) |
| *G01S 5/02* | (2010.01) |
| *H04W 64/00* | (2009.01) |

(52) U.S. Cl.
CPC ............... *H04W 4/022* (2013.01); *G01S 5/02* (2013.01); *G01S 5/0252* (2013.01); *H04W 64/006* (2013.01)

(58) Field of Classification Search
CPC ... H04W 4/022; H04W 64/006; H04W 64/00; G01S 5/02; G01S 5/0252; G01S 5/021
See application file for complete search history.

(56) References Cited

U.S. PATENT DOCUMENTS

| | | | | |
|---|---|---|---|---|
| 2013/0184031 A1* | 7/2013 | Pollington | ............ | H04W 88/02 455/556.1 |
| 2013/0260693 A1* | 10/2013 | Un | ............ | G01S 5/02 455/67.11 |
| 2014/0134948 A1* | 5/2014 | Ghose | ............ | G01S 5/021 455/41.2 |

FOREIGN PATENT DOCUMENTS

| | | |
|---|---|---|
| KR | 10-2006-0047806 | 5/2006 |
| KR | 10-2006-0073661 | 6/2006 |
| KR | 10-2009-0088191 | 8/2009 |
| KR | 10-2010-0132460 | 12/2010 |

(Continued)

*Primary Examiner* — Kathy Wang-Hurst
*Assistant Examiner* — Said M Elnoubi
(74) *Attorney, Agent, or Firm* — Fish & Richardson P.C.

(57) ABSTRACT

Techniques of range free proximity determination are described. A mobile device can determine an entry into or exit from a proximity fence upon determining that the mobile device is sufficiently close to a signal source. The proximity fence can be a virtual fence defined by the signal source and associated with a service. The mobile device can detect signals from multiple signal sources. The mobile device can determine that, among the signal sources, one or more signal sources are located closest to the mobile device based on a ranking of the signal sources using signal strength. The mobile device can determine a probability indicating a confident level of the ranking. The mobile device can determine that the mobile device entered or exited a proximity fence associated with a highest ranked signal source satisfying a confidence threshold.

20 Claims, 7 Drawing Sheets

(56) References Cited

FOREIGN PATENT DOCUMENTS

KR   10-2012-0058620   6/2012

* cited by examiner

RANGE-FREE PROXIMITY DETERMINATION

CROSS-REFERENCE TO RELATED APPLICATION

This application is a divisional of and claims priority to U.S. patent application Ser. No. 14/157,425, filed on Jan. 16, 2014, the entire contents of which are incorporated herein by reference.

TECHNICAL FIELD

This disclosure relates generally to location determination.

BACKGROUND

Some mobile devices have features for providing location-based services. For example, a mobile device can execute a pre-specified application program or present certain content upon entering or exiting a geofence. The geofence can be defined by a point location and a radius. The point location can have a longitude coordinate and a latitude coordinate. The mobile device can determine that the mobile device has entered the geofence or exited the geofence by determining an estimated location of the mobile device and calculating a distance between the estimated location and the point location. Based on whether the calculated distance exceeds the radius of the geofence, the mobile device can determine whether the mobile device entered or exited the geofence. The mobile device can calculate the distance using various technologies. For example, the mobile device can calculate the distance using location coordinates from a global navigation system (e.g., GPS).

SUMMARY

Techniques of range-free proximity determination are described. A mobile device can determine an entry into or exit from a proximity fence upon determining that the mobile device is sufficiently close to a signal source. The proximity fence can be a virtual fence defined by the signal source and associated with a service. The mobile device can detect signals from multiple signal sources. The mobile device can determine that, among the signal sources, one or more signal sources are located closest to the mobile device based on a ranking of the signal sources using signal strength. The mobile device can determine a probability indicating a confident level of the ranking. The mobile device can determine that the mobile device entered or exited a proximity fence associated with a highest ranked signal source satisfying a confidence threshold.

The features described in this specification can be implemented to achieve one or more advantages. For example, compared to conventional location determination based on signal sources, range-free proximity determination can be more consistent. A conventional location determination system can determine that a mobile device is proximate to a signal source based on ranging, where the system determines a distance based on a free space signal propagation model where, in principle, power density of a signal is inversely proportional to a square of a distance from a source of the signal.

The model used in ranging technology can vary significantly based on environment. For example, objects such as walls or humans between the mobile device and the signal source can affect the power density and measured signal strength. In addition, the model can vary significantly from device to device, corresponding to differences in radio reception characteristics of each device and antenna variations between devices. The variance caused by the environment and devices can cause inaccuracies in proximity determination. The techniques described in this specification can be independent of the free space signal propagation model, can address the inconsistencies caused by the environment, and can be consistent across devices. Accordingly, the techniques described in this specification can provide a more accurate proximity determination and better user experience.

Compared to a conventional geofencing techniques, the techniques described in this specification permit implementation of more complex location-based services. Multiple low energy signal sources having short communication ranges (e.g., 50 meters or less) can be used to define various services. For example, a different Bluetooth™ low energy (BLE) beacon can be placed at each aisle of a store. A mobile device detecting signals from multiple beacons can determine a beacon that is located closest to the mobile device, and then activate services related to that beacon (e.g., by displaying information on products placed in a particular aisle).

The details of one or more implementations of range-free proximity determination are set forth in the accompanying drawings and the description below. Other features, aspects, and advantages of range-free proximity determination will become apparent from the description, the drawings, and the claims.

BRIEF DESCRIPTION OF THE DRAWINGS

Like reference symbols in the various drawings indicate like elements.

DETAILED DESCRIPTION

Exemplary Range-Free Proximity Determination

Figure 1:
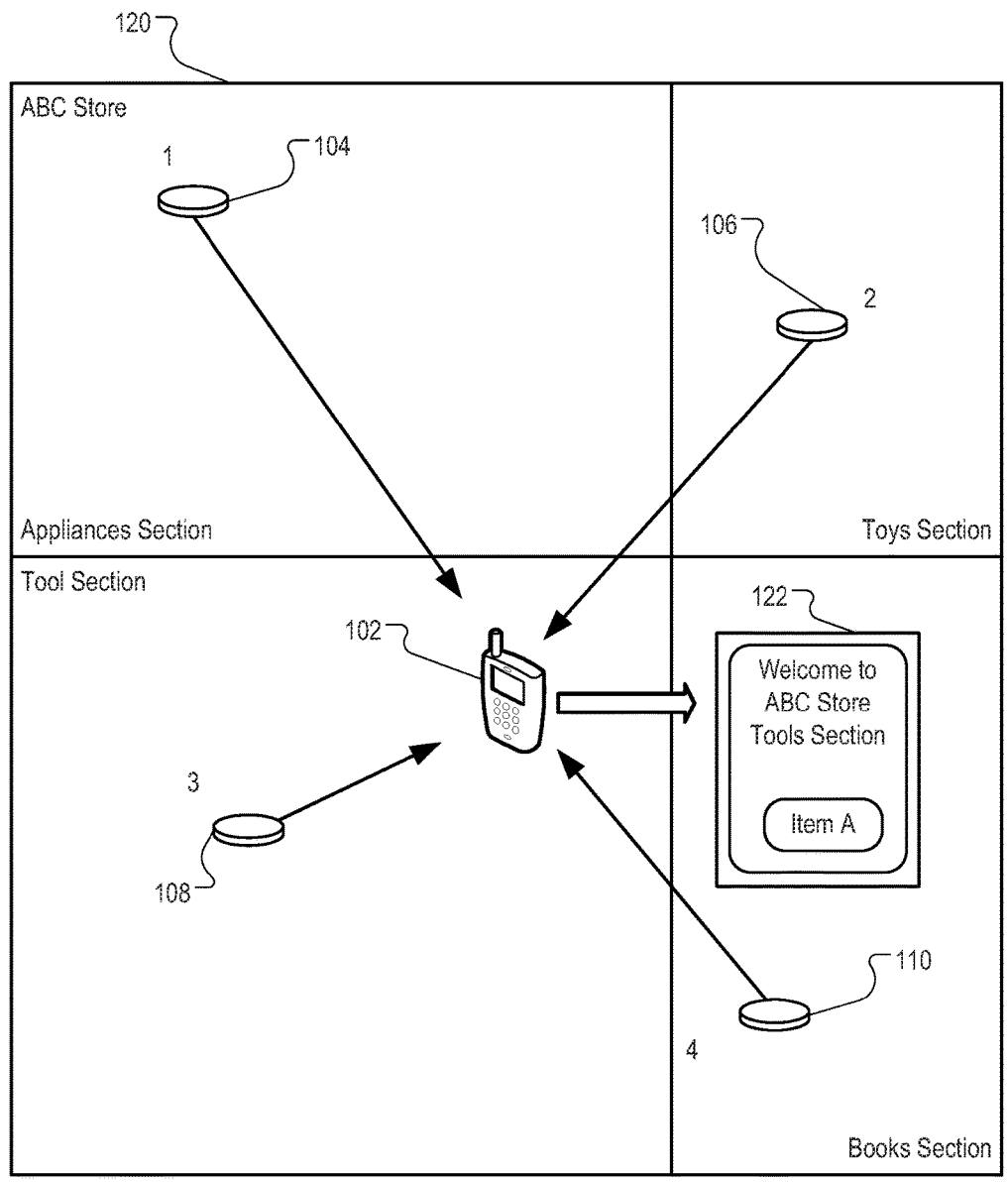
FIG. 1 is a diagram illustrating an exemplary mobile device triggering a location-based service based on range-free proximity determination.

FIG. 1 is a diagram illustrating an exemplary mobile device triggering a location-based service based on range-free proximity determination. Mobile device 102 can be an exemplary device programmed to trigger a different function upon entering a proximity fence. A proximity fence can be a location-agnostic fence defined by signal sources having no geographic location information. Each proximity fence can correspond to a group of one or more signal sources instead of a point location fixed to latitude and longitude coordinates. In the example shown, each of signal sources 104, 106, 108, and 110 can correspond to a different proximity fence located at venue 120. Mobile device 102 can detect signals from each of signal sources 104, 106, 108, and 110. Mobile device 102 can determine which of the proximity fences mobile device 102 has entered using range-free proximity determination.

Each of signal sources 104, 106, 108, and 110 can be a wireless beacon configured to broadcast a signal, e.g., a beacon signal. In some implementations, signal sources 104, 106, 108, and 110 are radio frequency (RF) transmitters. In some implementations, signal sources 104, 106, 108, and 110 can be Institute of Electrical and Electronics Engineers (IEEE) 802.11u compliant Wi-Fi™ beacons. In some implementations, signal sources 104, 106, 108, and 110 can be Bluetooth™ low energy (BLE) or near field communication (NFC) beacons. Signal sources 104, 106, 108, and 110 can have a same device type or different device types. Each of signal sources 104, 106, 108, and 110 can broadcast the beacon signal through one or more specified channels. The beacon signal can include an identifier of the respective signal source. The identifier can include a universally unique identifier (UUID), a media access control (MAC) address, or a pre-stored label. In this example, the identifiers for signal sources 104, 106, 108, and 110 are 1, 2, 3, and 4, respectively.

Signal sources 104, 106, 108, and 110 can each be placed at a different location at venue 120. Venue 120, e.g., "ABC Store," can be an indoor or outdoor space accessible by a pedestrian carrying mobile device 102. Venue 120 can have multiple sections, e.g., an appliances section, a toys section, a tool section, and a books section. Each of signal sources 104, 106, 108, and 110 can be located at a respective section and correspond to a proximity fence specific to that section. For example, signal source 108, placed in the tools section, can correspond to a proximity fence for displaying information about tools sold at ABC store.

A reach of each of signal sources 104, 106, 108, and 110 can cover the entire space of venue 120. For example, a signal from each of signal sources 104, 106, 108, and 110 can be detected by mobile device 102 when mobile device 102 is located at venue 120. To display most relevant information to a user, mobile device 102 can determine in which section of venue 120 mobile device 102 is located. To determine the section, mobile device 102 can determine which one of the signal sources 104, 106, 108, and 110 is located closest to mobile device 102. Structures (e.g., walls), objects (e.g., items on shelves), and people may attenuate signals from signal sources 104, 106, 108, and 110 in unpredictable ways to make application of free space signal propagation model difficult.

Mobile device 102 can determine a closest signal source using range-free proximity determination techniques. For example, mobile device 102 can determine that, among signal sources 104, 106, 108, and 110, signal source 108 is located closest to mobile device 102. In addition, based on the identifier of signal source 108, mobile device 102 can determine, e.g., by searching an index mapping signal source identifiers and sections of venue 120, that signal source 108 (having an identifier of " 3) is associated with a tools section of venue 120. Accordingly, mobile device 102 can determine that mobile device 102 is located within the proximity fence for the tools section, and trigger a function related to the tools section of venue 120. For example, mobile device 102 can display user interface 122 that presents information on items of the tools section.

Figure 2:
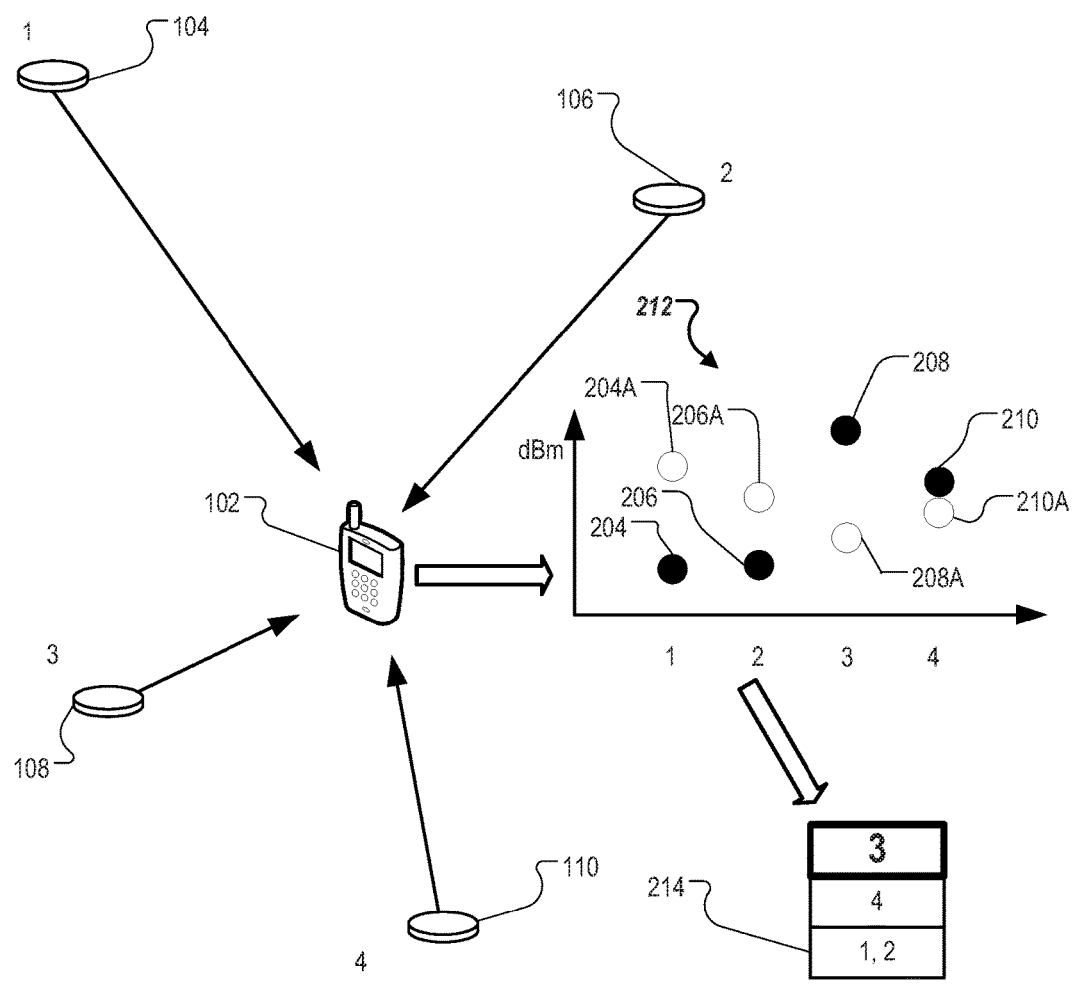
FIG. 2 is a diagram providing a technical overview of exemplary range-free proximity determination.

FIG. 2 is a diagram providing a technical overview of range-free proximity determination. Mobile device 102 can detect beacon signals from signal sources 104, 106, 108, and 110, each signal source corresponding to a different proximity fence. Mobile device 102 can determine into which proximity fence mobile device 102 entered.

Mobile device 102 can determine an estimated received signal strength (RSS) for signals from each of signal sources 104, 106, 108, and 110. Measured RSS of signals from each of signal sources 104, 106, 108, and 110 can vary over time due to multiple uncontrolled factors (e.g., environment, an attitude of mobile device 102, or sensor characteristics of mobile device 102). Mobile device can determine an estimated RSS based on measured RSS of signals received from a time window of N seconds. Each estimated RSS can have a pre-calibration value determined based on the measured RSS, and a calibration value.

Calibrated RSS and pre-calibration RSS are shown in graph 212. Estimated RSS 204, 206, 208, and 210 each can be a calibrated value, e.g., in decibel relative to one milliwatt (dBm), as shown over a vertical axis. Estimated RSS 206, 204, 210, and 208 can each have a pre-calibration value 204A, 206A, 208A, or 210A, respectively. The pre-calibration values 204A, 206A, 208A, and 210A can be a measured RSS value for each of signal sources 104, 106, 108, and 110, respectively. Due to variations in signal source types or brands, manufacturing variations, or environment, each of signal sources 104, 106, 108, and 110 may transmit signals at different power. A measurement at a given distance, e.g., one meter, of each of signal sources 104, 106, 108, and 110 is taken. Each of the signal sources 104, 106, 108, and 110 then broadcasts the measurement as a calibration value.

For example, at one meter, signal source 104 may have a measured RSS value of −57 dBm, whereas signal source 106 may have a measured RSS value of −61 dBm. Each of signal source 104 and signal source 106 may broadcast a respective calibration value. Mobile device 102, at a location, may detect measured RSS values −61 dBm and −62 dBm from signal source 104 and signal source 106, respectively, indicating that mobile device 102 appears to be located closer to signal source 104 than to signal source 106. During calibration, mobile device 102 deducts the calibration value from the measured RSS values to remove manufacturing or environmental variations. In the example shown, estimated RSS 204 and 206 are −4 dBm ((−61)-(−57)) and −1 dBm ((−62)-(−60)), respectively, indicating that mobile device 102 is located closer to signal source 106 than to signal source 104.

Mobile device 102 can sort signal sources based on the calibrated RSS values. Based on the estimated RSS 204, 206, 208, and 210, where RSS 210 has the highest magnitude, mobile device 102 can determine sorted list 214, where signal source 108 (the identifier of which is "3") ranks the highest.

Mobile device 102 can then determine a confidence level for a rank of each of estimated RSS 204, 206, 208, and 210 in sorted list 214. The confidence level for a rank can be different from a confidence level of accuracy of an estimated RSS. Mobile device 102 can determine the confidence level of a rank of a particular estimated RSS (e.g., estimated RSS 208) based on a difference between the pre-calibration or post-calibration value of that estimated RSS and a pre-calibration or post-calibration value of another estimated RSS. A greater difference can correspond to a higher confidence level. Mobile device 102 can determine a sublist of sorted list 214 by applying a threshold to the confidence level. Mobile device 102 can determine that a signal source is included in the sublist upon determining that a corresponding confidence level satisfies the threshold. For example, mobile device 102 can determine that signal source 108 and 110 correspond to confidence levels satisfying the threshold. Mobile device 102 can then use a sublist of sorted list 214 including signal sources 108 and 110, in that order, to determine a proximity fence that mobile device 102 entered. Mobile device 102 can designate a highest ranked signal source in the sublist, in this example, signal source 108, as a signal source located closest to mobile device 102. Accordingly, mobile device 102 can determine that mobile device 102 has entered the proximity fence associated with signal source 108.

Exemplary False Sort Determination

Figure 3A:
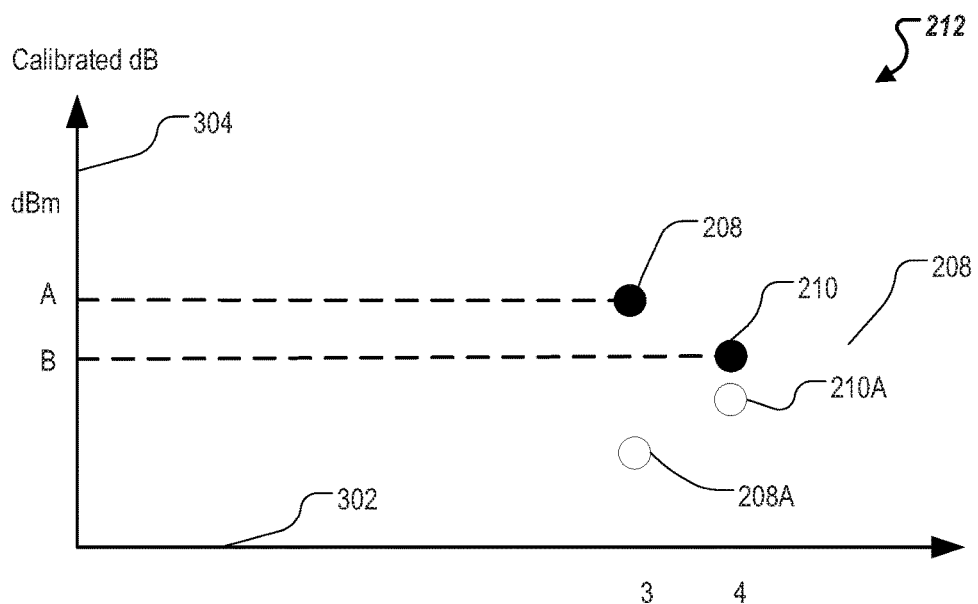
FIGS. 3A and 3B illustrate exemplary techniques for determining a probability of a false sort used in range-free proximity determination.

FIG. 3A is a graph illustrating exemplary false sort determination techniques in range-free proximity determination. The graph can correspond to a portion of graph 212 of FIG. 2. Estimated RSS 204, 206, 208, and 210, when calibrated, can be sorted based on their respective pre-calibration or post-calibration value. Horizontal axis 302 represents different signal sources, e.g., signal sources 108 and 110. Vertical axis 304 represents the calibrated RSS value. For example, estimated RSS 208 can have a higher mean value of A whereas estimated RSS 210 can have a lower mean value of B. Mobile device 102 can sort signal sources 108 and 110 such that, in a sorted list, signal source 108, corresponding to the higher mean value A, is ranked higher than signal source 110, corresponding to the lower mean value B.

Mobile device 102 can determine a confidence level of the sorted list, including a confidence level that the higher rank of signal source 108 correctly indicates that a distance between mobile device 102 and signal source 108 is less than a distance between mobile device 102 and signal source 110. Mobile device 102 can determine a power separation between RSS 208 and RSS 210. The power separation is conceptually represented as distance d between values A and B as shown in FIG. 3A. Distance d can be dependent on a variance of each of the calibrated values corresponding to signal source 108 and signal source 110, and may or may not correspond to an arithmetic value of A minus B. Mobile device 102 can determine the confidence level using a probability of a false sort (PFS) determined based on the power separation among signal sources.

Mobile device 102 can determine that a sort is false upon identifying an inconsistency based on a probability distribution, for example, upon determining that error condition (1) A>B but A'<B', or error condition (2) A<B but A'>B' are satisfied. In error conditions (1) and (2), each of A and B is a value of an estimated RSS. In addition, in error conditions (1) and (2), A' and B' are defined as A'=A+t(A), and B'=B+t(B), where t(A) and t(B) are probability distribution functions representative of RSS noise. The probability distribution functions can be represented as Q(A) and Q(B), having a mean and a variance. Mobile device 102 can determine that a probability of false sort where error condition (1) A>B but A'<B' is satisfied based on a cumulative probability distribution, expressed using rule (3) below.

$$PFS(A' < B' \mid A > B) = \int_{-\infty}^{0} Q(x)dx \quad (3)$$

where PFS(A'<B'|A>B) is a conditional probability of false sort where A>B but A'<B'.

Mobile device 102 can determine that a probability of false sort where error condition (2) A<B but A'>B' is satisfied based on a cumulative probability distribution, expressed using rule (4) below.

$$PFS(A' > B' \mid A < B) = \int_{0}^{\infty} Q(x)dx \quad (4)$$

where PFS(A'>B'|A<B) is a conditional probability of false sort where A<B but A'>B'.

Mobile device 102 can then apply rule (3) and rule (4) to the sorted list, including selecting a sublist of signal sources form the sorted list based on selection condition (5) below.

$$|A-B| > T(PFS), \quad (5)$$

where T(PFS) is a threshold determined based on a pre-specified PFS value (e.g., 0.5). Mobile device 102 can select those signal sources that satisfy condition (5) to be included in the sublist.

Figure 3B:
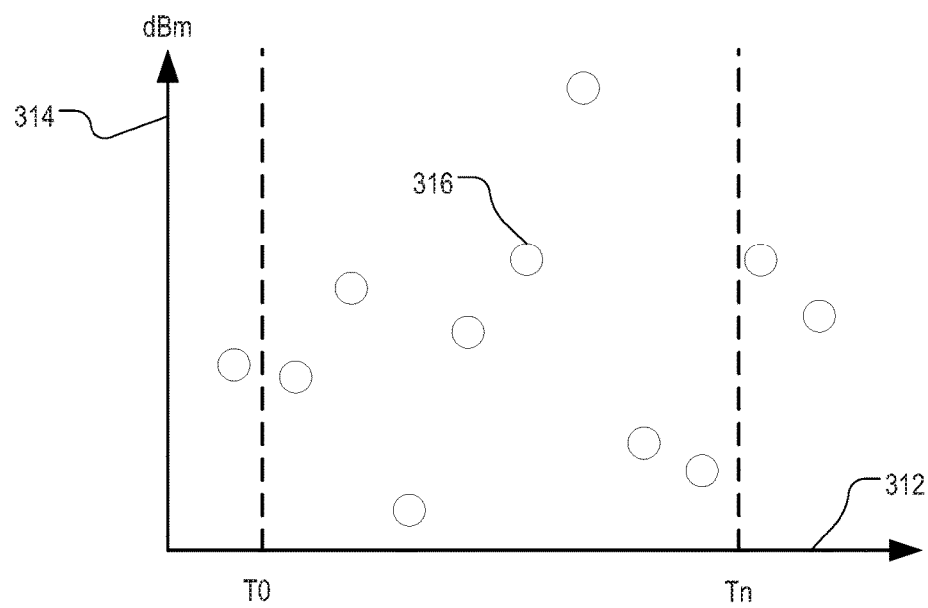

FIG. 3B is a graph illustrating techniques for determining a probability distribution of an estimated RSS. The probability distribution can be Q(A) or Q(B) described in reference to FIG. 3A. Horizontal axis 312 represents time. Vertical axis 314 represents measured RSS of signals from a signal source (e.g., signal source 104, 106, 108, or 110). Each circle (e.g., circle 316) represents a measurement taken from a sensor of mobile device 102.

Mobile device 102 can measure signals from signal sources 104, 106, 108, and 110 in a time window of N seconds between time T0 and time Tn. Each signal source can have a corresponding measured RSS. Due to factors including multipath effect and noise, measured RSS values of signals can vary over the time window. Mobile device 102 can determine a pre-calibration value 208A that is represented as a probability distribution having a mean value and a variation. The variance can represent a spread of the measurements. The variance can be determined based on how far the set of measurements spread out between time T0 and time Tn.

Exemplary Device Components

Figure 4:
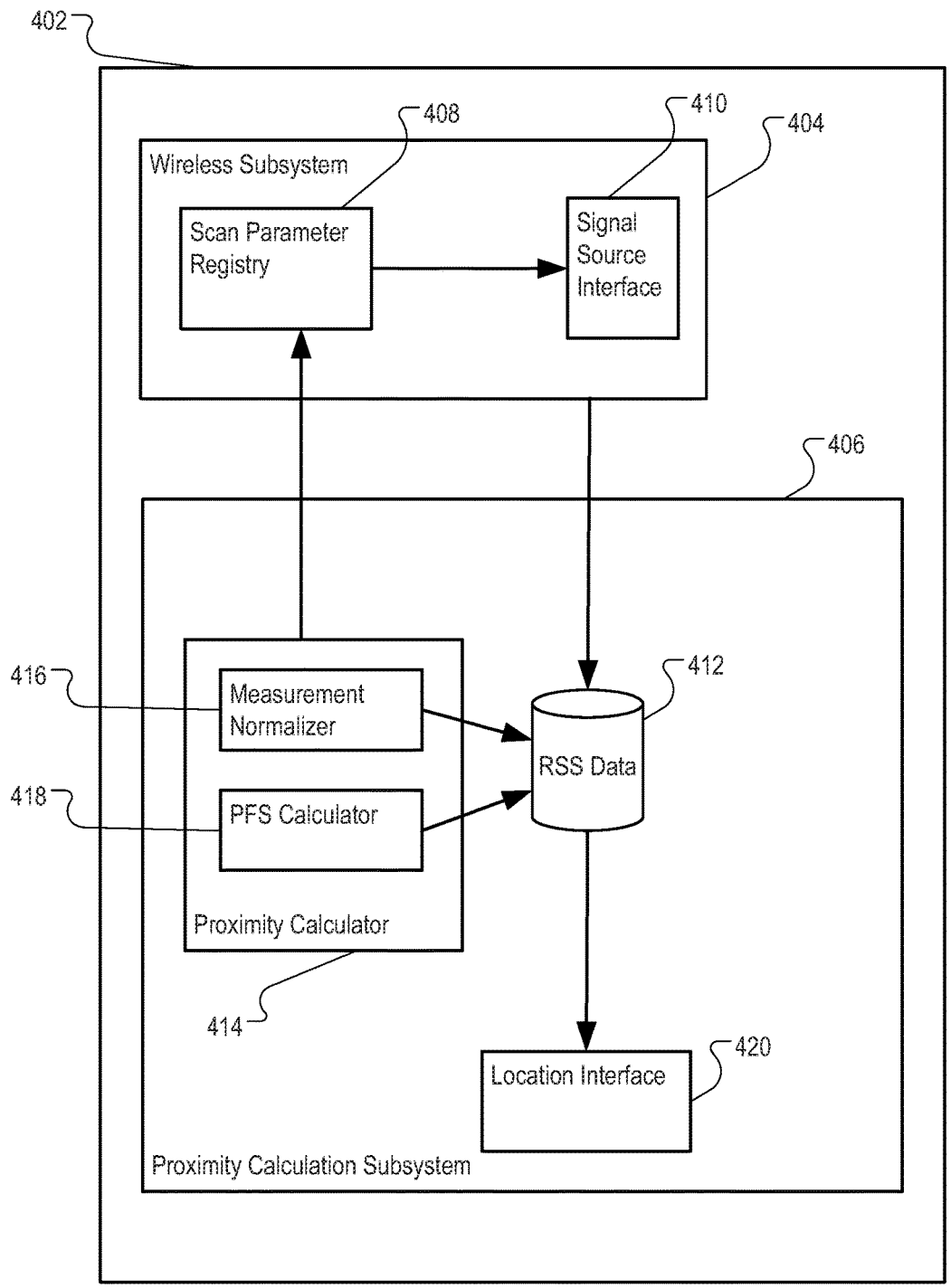
FIG. 4 is a block diagram illustrating components of an exemplary range-free proximity determination subsystem of a mobile device.

FIG. 4 is a block diagram illustrating components of an exemplary proximity determination subsystem 402 of mobile device 102. Each component of subsystem 402 can include hardware, software, and firmware components. Subsystem 402 can include wireless subsystem 404 and proximity calculation subsystem 406.

Wireless subsystem 404 is a component of subsystem 402 that includes an antenna, a wireless processor, and software or firmware. Wireless subsystem 404 can include scan parameter registry 408. Scan parameter registry 408 can store one or more parameters for scanning. The parameters can include a time window length and one or more identifiers identifying channels for scanning. Wireless subsystem 404 can include signal source interface 410. Signal source interface 410 is a component of wireless subsystem 404 including hardware and software configured to scan one or more communication channels for beacon signals from signal sources, to detect signal source identifiers from the scans, and to determine a measured RSS for each beacon signal. Wireless subsystem 404 can provide the measured RSS data to proximity calculation subsystem 406.

Proximity calculation subsystem 406 can include one or more processors (e.g., application processors) configured determine proximity between mobile device 102 and signal sources. Proximity calculation subsystem 406 can include RSS data store 412 for storing the measured RSS data received from wireless subsystem 404.

Proximity calculation subsystem 406 can include proximity calculator 414. Proximity calculator 414 is a component of proximity calculation subsystem 406 configured to determine a group of one or more signal sources that, with sufficient confidence, are located closest to mobile device 102. Proximity calculator 414 can include measurement normalizer 416 and PFS calculator 418. Measurement normalizer 416 is a component of proximity calculator 414 configured to determine an estimated RSS for each signal source based on the RSS data received from wireless subsystem 404. Measurement normalizer 416 can calibrate the estimated RSS, sort the signal sources in RSS data store 412 based on a pre-calibration value of each estimated RSS. Measurement normalizer 416 can store a sorted list of signal sources in RSS data store 412.

PFS calculator 418 is a component of proximity calculator 414 configured to determine a PFS for each signal source in the sorted list based on a separation between the pre-calibration value of each estimated RSS of that signal source and other signal sources. PFS calculator 418 can filter the sorted list by selecting, from the sorted list, those signal sources having corresponding PFS value that satisfies a confidence threshold. PFS calculator 418 can determine a sublist based on selected signal sources, and store the sublist in RSS data store 412.

Proximity calculation subsystem 406 can include location interface 420. Location interface 420 is a component of proximity calculation subsystem 406 configured to receive a request from an application program or another subsystem of mobile device 102, and provide the sublist of signal sources in response to the request. The application program or other subsystem can perform a function based on signal source identifiers in the sublist. For example, a program can perform a function specific to a proximity fence associated to a signal source determined to be located closest to mobile device 102. The function can activate a user interface item. The user interface item can be a visual item (e.g., a welcome message displayed on a screen), an audio item (e.g., a synthesized or recorded voice message), or a physical item (e.g., vibration of mobile device 102 for reminding a user).

Exemplary Procedures

Figure 5:
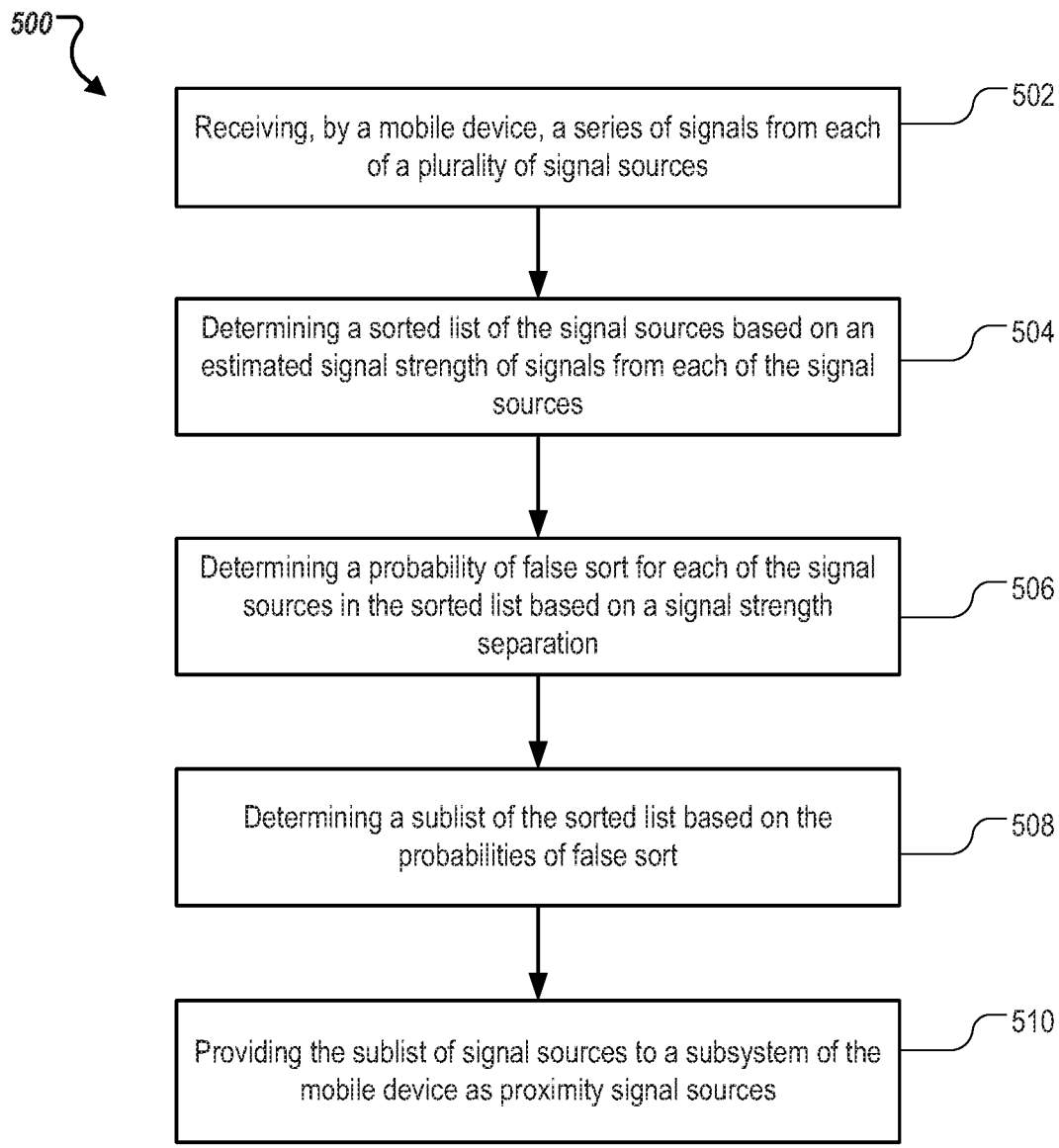
FIG. 5 is a flowchart of an exemplary procedure of range-free proximity determination.

FIG. 5 is a flowchart of exemplary procedure 500 of range-free proximity determination. Procedure 500 can be performed by mobile device 102.

Mobile device 102 can receive (502), using wireless subsystem 404, a series of signals from each of a group of signal sources. The signal sources can be signal sources detectable by mobile device 102. The signals can be RF signals. Each signal source can be a BLE device, an NFC device, or a wireless access point in a local area network or a personal area network. The series of signals can be signals detected in a time window having a pre-specified length.

Mobile device 102 can determine (504), using measurement normalizer 416, a sorted list of the signal sources based on an estimated signal strength of signals from each of the signal sources. Mobile device 102 can give a signal source a higher ranking in the sorted list upon determining that the signal source is associated with a higher estimated signal strength. Determining the sorted list can include calculating the estimated signal strength of signals of each signals based on a cumulative distribution filter being applied to the series of signals corresponding to the signal source over a pre-determined time window. Mobile device 102 can determine the sorted list based on the calculated signal strength of signals from each signal source.

Mobile device 102 can determine (506), using PFS calculator 418, a probability of false sort for each of the signal sources in the sorted list based on a signal strength separation between signals corresponding to the signal source and other received signals. The probability of false sort of a signal source can indicate a probability that a rank of the signal source is incorrect. Mobile device 102 can determine that a greater signal strength separation between an estimated RSS and other estimated RSS values corresponds to a lower probability of false sort. Determining the probability of false sort for each of the signal sources can include determining a cumulative value of a signal strength noise over time for each signal source.

Mobile device 102 can determine (508), using PFS calculator 418, a sublist of the sorted list based on the probabilities of false sort. The sublist can include one or more signal sources each of which being associated with a probability of false sort that satisfies a threshold value. Determining the sublist can include selecting, from the sorted list, a group of one or more signal sources that includes a highest ranked signal source that is associated with a probability of false sort that satisfies the threshold value. Mobile device 102 can designate the selected group as the sublist. Mobile device 102 can determine the sublist independently of a proximity estimation using a free space signal propagation model.

In some implementations, mobile device 102 can filtering the sublist based on a detected change of ranking of a signal source in the sublist. Mobile device 102 can filter the sublist using a recursive filter and a reading from a motion sensor of mobile device 102. Mobile device 102 can filter out a signal source upon determining a change in rank of the signal source while the reading indicates that mobile device 102 is stationary.

Mobile device 102 can provide (510), using location interface 420, the sublist of signal sources to a subsystem of the mobile device as proximity signal sources for determining a location of the mobile device. The location can be a point location having latitude, longitude, and altitude coordinates. Alternatively, the location can be a location corresponding to a proximity fence, where a service is associated with a signal source. Mobile device 102 can trigger the surface upon determining that mobile device 102 is located in closer proximity with that signal source than with other signal sources.

Exemplary Mobile Device Architecture

Figure 6:
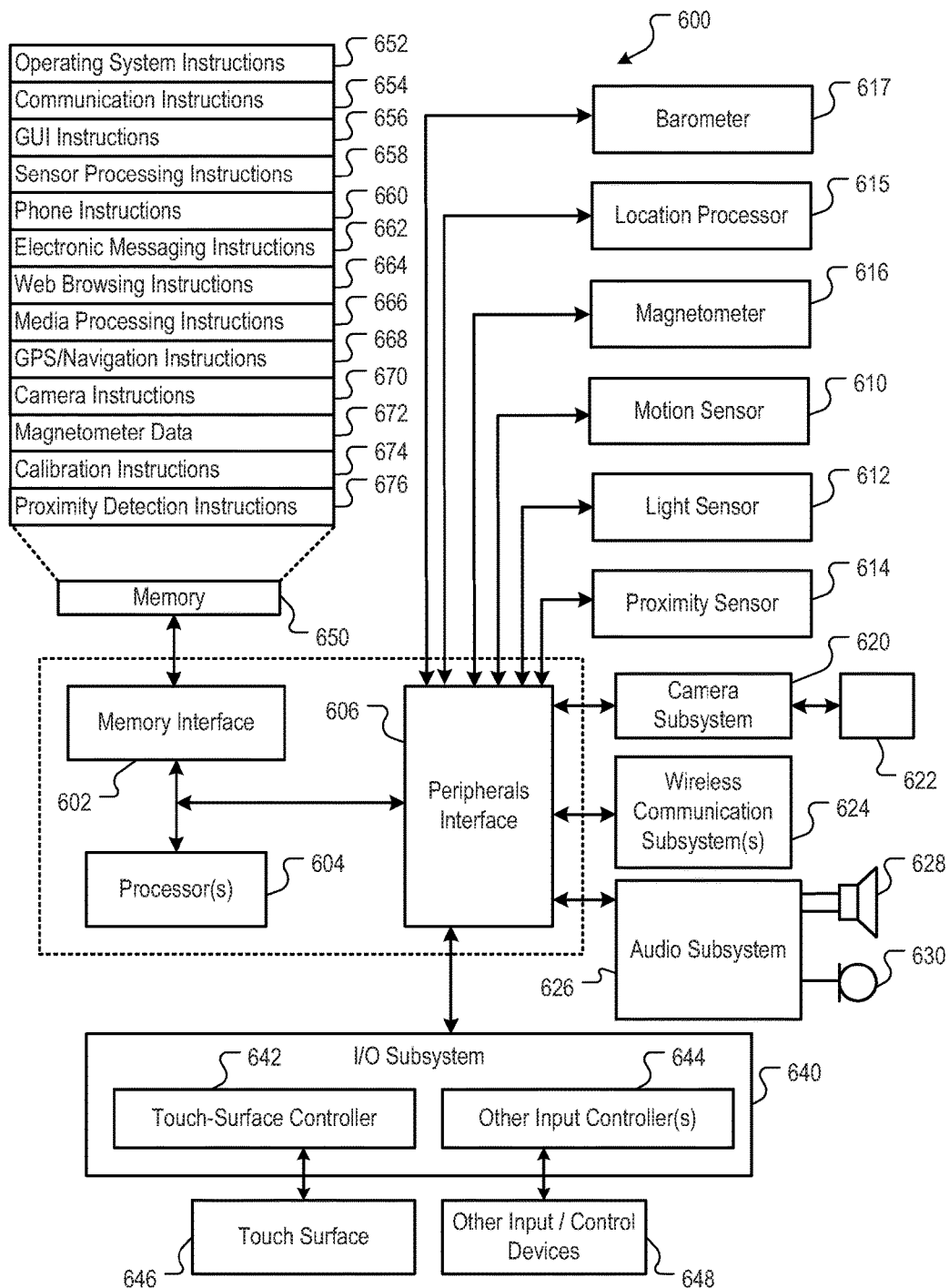
FIG. 6 is a block diagram illustrating an exemplary device architecture of a mobile device implementing the features and operations of FIGS. 1-5.

FIG. 6 is a block diagram illustrating exemplary device architecture 600 of a mobile device implementing the features and operations of FIGS. 1-5. A mobile device (e.g., mobile device 102) can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include application processors, baseband processors, and wireless processors. The various components in mobile device 102, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network, and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to mobile device 102 on or off. The user may be able to customize a functionality of one or more of the buttons. The touch surface 646 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin®, RTXC®, LINUX®, UNIX®, OS X®, WINDOWS®, iOS®, or an embedded operating system such as VxWorks®. Operating system 652 may include instructions for handling basic system services and for performing hardware dependent tasks. In some implementations, operating system 652 can include a kernel (e.g., UNIX® kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store proximity detection instructions 676 that, when executed, can cause processor 604 to perform operations of proximity determination subsystem 402, including executing procedure 500.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
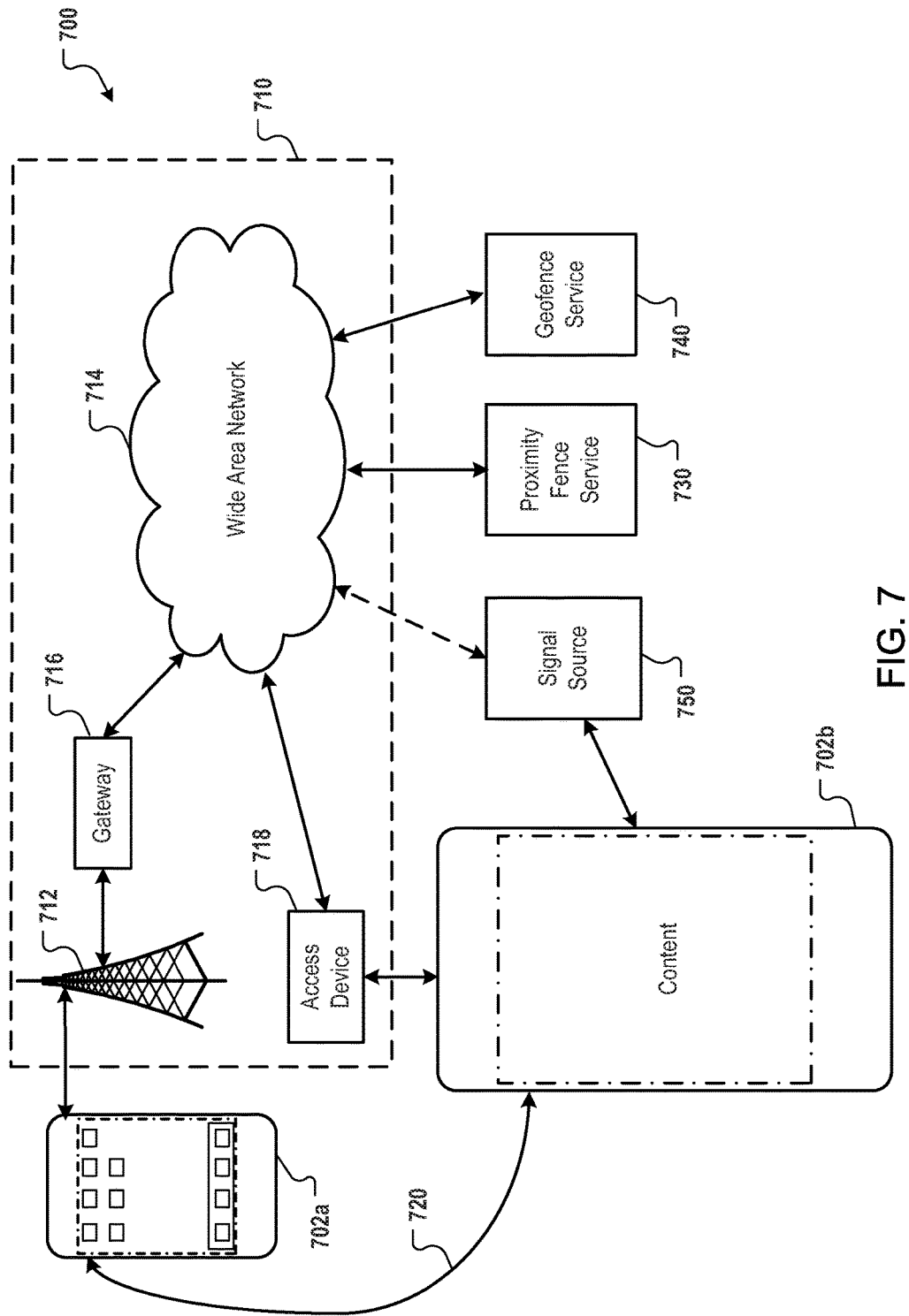
FIG. 7 is a block diagram of an exemplary network operating environment for the mobile devices implementing the features and operations of FIGS. 1-5.

FIG. 7 is a block diagram of exemplary network operating environment 700 for the mobile devices implementing the features and operations of FIGS. 1-5. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, mobile device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

Mobile device 702a or 702b can, for example, communicate with one or more services 730 and 740 over the one or more wired and/or wireless networks. For example, proximity fence service 730 can provide proximity fence-triggered application programs and associated identifiers to mobile devices 702a and 702b. Geofence service 740 can provide location based services. Upon determining that mobile devices 702a and 702b is located in proximity with a signal source, mobile devices 702a and 702b can access proximity fence service 730 or geofence service 740.

Mobile device 702a or 702b can communicate with one or more signal sources 750. Each signal source 750 can be a wireless beacon configured to broadcast a signal source identifier. The signal source identifier can include a UUID and one or more labels corresponding to high-level and low-level proximity fences, respectively. Each signal source 750 can communicate to other devices through wide area network 714 or facilitate communication between mobile device 702a or 702b with the other devices. In some implementations, each signal source 750 can be independent from a communications network, and function solely as beacons of proximity fences.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   receiving, by a mobile device, a signal from each of a plurality of signal sources, each signal having a received signal strength (RSS), wherein each signal source is associated with a calibration value;
   calibrating each of the RSSs based on the calibration value associated with the signal source from which the respective signal is received;
   arranging the signal sources in a sorted list based on the calibrated RSSs, wherein signal sources corresponding to calibrated RSSs of relatively higher values are positioned relatively higher in the sorted list;
   for one or more of the signal sources in the sorted list, determining a difference between the calibrated RSS of the signal received by the signal source and the calibrated RSS of the signal received by at least one other signal source that is positioned next to the signal source in the sorted list;
   for one or more of the signal sources in the sorted list, comparing a magnitude of the difference to a threshold value;
   determining a sublist of the signal sources, the sublist including one or more signal sources from the sorted list, wherein the one or more signal source is to be included in the sublist if the magnitude of the difference between the calibrated RSS associated with the signal source and the calibrated RSS associated with the at least one other signal source is greater than the threshold value; and
   determining a location of the mobile device as proximate to at least one signal source of the sublist.

2. The method of claim 1, wherein:
   the signals are radio frequency (RF) signals, and
   each signal source is a Bluetooth™ low energy (BLE) device, a near field communication (NFC) device, or a wireless access point in a local area network or a personal area network.

3. The method of claim 1, comprising filtering the sublist based on a detected change of order of the signal sources in the sublist using a recursive filter and a reading from a motion sensor of the mobile device, wherein the mobile device filters out a signal source upon determining a change in rank of the signal source while the reading indicates that the mobile device is stationary.

4. The method of claim 1, wherein determining the sublist is independent of a proximity estimation using a free space signal propagation model.

5. The method of claim 1, wherein, for each signal source, the calibration value comprises an RSS of a signal received by a device positioned at a predetermined distance from the respective signal source.

6. The method of claim 5, wherein the predetermined distance is one meter.

7. The method of claim 1, wherein the at least one other signal source is positioned above or below the signal source in the sorted list.

8. The method of claim 1, wherein a first signal source is positioned in the sorted list next to and below a signal source having a highest position in the sorted list, and a second signal source is positioned in the sorted list next to and above a signal source having a lowest position in the sorted list.

9. A non-transitory storage device storing computer instructions operable to cause a mobile device to perform operations comprising:
receiving, by the mobile device, a signal from each of a plurality of signal sources, each signal having a received signal strength (RSS), wherein each signal source is associated with a calibration value;
calibrating each of the RSSs based on the calibration value associated with the signal source from which the respective signal is received;
arranging the signal sources in a sorted list based on the calibrated RSSs, wherein signal sources corresponding to calibrated RSSs of relatively higher values are positioned relatively higher in the sorted list;
for one or more of the signal sources in the sorted list, determining a difference between the calibrated RSS of the signal received by the signal source and the calibrated RSS of the signal received by at least one other signal source that is positioned next to the signal source in the sorted list;
for one or more of the signal sources in the sorted list, comparing a magnitude of the difference to a threshold value;
determining a sublist of the signal sources, the sublist including one or more signal sources from the sorted list, wherein the one or more signal source is to be included in the sublist if the magnitude of the difference between the calibrated RSS associated with the signal source and the calibrated RSS associated with the at least one other signal source is greater than the threshold value;
and determining a location of the mobile device as proximate to at least one signal source of the sublist.

10. The non-transitory storage device of claim 9, wherein:
the signals are radio frequency (RF) signals, and
each signal source is a Bluetooth™ low energy (BLE) device, a near field communication (NFC) device, or a wireless access point in a local area network or a personal area network.

11. The non-transitory storage device of claim 9, wherein each calibration value is a respective RSS value measured by a device positioned at a same given distance from the respective signal source.

12. The non-transitory storage device of claim 9, wherein determining the sublist is independent of a proximity estimation using a free space signal propagation model.

13. The non-transitory storage device of claim 9, wherein, for each signal source, the calibration value comprises an RSS of a signal received by a device positioned at a predetermined distance from the respective signal source.

14. The non-transitory storage device of claim 13, wherein the predetermined distance is one meter.

15. A mobile device comprising:
a processor; and
a non-transitory storage device storing computer instructions operable to cause the mobile device to perform operations comprising:
receiving, by the mobile device, a signal from each of a plurality of signal sources, each signal having a received signal strength (RSS), wherein each signal source is associated with a calibration value;
calibrating each of the RSSs based on the calibration value associated with the signal source from which the respective signal is received;
arranging the signal sources in a sorted list based on the calibrated RSSs, wherein signal sources corresponding to calibrated RSSs of relatively higher values are positioned relatively higher in the sorted list;
for one or more of the signal sources in the sorted list, determining a difference between the calibrated RSS of the signal received by the signal source and the calibrated RSS of the signal received by at least one other signal source that is positioned next to the signal source in the sorted list;
for one or more of the signal sources in the sorted list, comparing a magnitude of the difference to a threshold value;
determining a sublist of the signal sources, the sublist including one or more signal sources from the sorted list, wherein the one or more signal source is to be included in the sublist if the magnitude of the difference between the calibrated RSS associated with the signal source and the calibrated RSS associated with the at least one other signal source is greater than the threshold value; and
determining a location of the mobile device as proximate to at least one signal source of the sublist.

16. The mobile device of claim 15, wherein:
the signals are radio frequency (RF) signals, and
each signal source is a Bluetooth™ low energy (BLE) device, a near field communication (NFC) device, or a wireless access point in a local area network or a personal area network.

17. The mobile device of claim 15, the operations comprising filtering the sublist based on a detected change of order of the signal sources in the sublist using a recursive filter and a reading from a motion sensor of the mobile device, wherein the mobile device filters out a signal source upon determining a change in rank of the signal source while the reading indicates that the mobile device is stationary.

18. The mobile device of claim 15, wherein determining the sublist is independent of a proximity estimation using a free space signal propagation model.

19. The mobile device of claim 15, wherein, for each signal source, the calibration value comprises an RSS of a signal received by a device positioned at a predetermined distance from the respective signal source.

20. The mobile device of claim 19, wherein the predetermined distance is one meter.

* * * * *